(12) United States Patent
Ortlieb

(10) Patent No.: US 11,702,165 B2
(45) Date of Patent: Jul. 18, 2023

(54) ADAPTER SYSTEM FOR ATTACHING PANNIERS OR CONTAINERS TO LUGGAGE CARRIERS

(71) Applicant: ORTLIEB SPORTARTIKEL GMBH, Heilsbronn (DE)

(72) Inventor: Hartmut Ortlieb, Heilsbronn (DE)

(73) Assignee: ORTLIEB SPORTARIKEL GMBH, Heilsbronn (DE)

( * ) Notice: Subject to any disclaimer, the term of this patent is extended or adjusted under 35 U.S.C. 154(b) by 0 days.

(21) Appl. No.: 17/792,130

(22) PCT Filed: Jan. 11, 2021

(86) PCT No.: PCT/DE2021/000003
§ 371 (c)(1),
(2) Date: Jul. 11, 2022

(87) PCT Pub. No.: WO2021/143973
PCT Pub. Date: Jul. 22, 2021

(65) Prior Publication Data
US 2023/0130148 A1    Apr. 27, 2023

(30) Foreign Application Priority Data
Jan. 14, 2020    (DE) ..................... 20 2020 000 129.5

(51) Int. Cl.
*B62J 7/04*    (2006.01)
*B62J 7/08*    (2006.01)

(52) U.S. Cl.
CPC .................. *B62J 7/04* (2013.01); *B62J 7/08* (2013.01)

(58) Field of Classification Search
CPC ......... B62J 9/27; B62J 9/23; B62J 9/24; B62J 7/08; B62J 7/04; B62J 7/00
See application file for complete search history.

(56) References Cited

U.S. PATENT DOCUMENTS

| 11,608,134 B2* | 3/2023 | Ortlieb ...................... B62J 7/04 |
| 2006/0138185 A1* | 6/2006 | Lien ........................... B62J 7/04 |
| | | 224/427 |

(Continued)

FOREIGN PATENT DOCUMENTS

| DE | 1930993 | 6/1969 |
| DE | 29612256 U1 | 10/1996 |

(Continued)

OTHER PUBLICATIONS

PCT/DE2020/000221, International Search Report and Written Opinion dated Jan. 22, 2021, 14 pages—German, 3 pages—English.

(Continued)

*Primary Examiner* — Corey N Skurdal
(74) *Attorney, Agent, or Firm* — Andrew F. Young; Nolte Lackenbach Siegel

(57) ABSTRACT

An adapter system for attaching panniers or containers to luggage carriers, in particular for attaching panniers or containers to the top of a luggage carrier, has releasable fixing elements for engaging between respective structs and respective struts of the luggage carrier. The positions of the fixing elements is adjustable and are arrangeable on respective struts and/or cross members or plates or frames of the adapter system, wherein at least one strut and/or cross member and/or plate is designed with a plurality of retaining elements protruding from its surface facing the luggage carrier.

6 Claims, 3 Drawing Sheets

(56) References Cited

U.S. PATENT DOCUMENTS

2010/0108729 A1    5/2010  Golub
2012/0145759 A1*   6/2012  Shih .......................... B62J 7/00
                                                        224/412

FOREIGN PATENT DOCUMENTS

| DE | 10031069 A1    | 3/2001  |
|----|----------------|---------|
| DE | 202004019891   | 6/2005  |
| DE | 102006055463 A1| 5/2008  |
| DE | 102007040557 A1| 3/2009  |
| DE | 102009030000 A1| 12/2010 |
| DE | 202013101143   | 5/2013  |
| DE | 102015008780 A1| 1/2017  |
| DE | 102016010026 A1| 2/2018  |
| DE | 202019004035   | 11/2019 |
| EP | 3281 852 A1    | 8/2017  |
| EP | 3281853 A1     | 2/2018  |
| WO | WO 2021/014397 | 1/2021  |

OTHER PUBLICATIONS

PCT/DE2021/000003, ISR and Written Opinion dated Apr. 15, 2021, 7 pgs—English, 9 pgs—GErman.

* cited by examiner

ADAPTER SYSTEM FOR ATTACHING PANNIERS OR CONTAINERS TO LUGGAGE CARRIERS

RELATED APPLICATION AND INCORPORATION STATEMENT

This application relates to and claims the priority from Ser. No.: PCT/DE2021/000003 filed Jan. 11, 2021, the entire contents of which are incorporated herein by reference in their entirety, which in turn claims priority from DE Ser. No.: 20 2020 000 129.5 filed Jan. 14, 2020.

FIGURE SELECTED FOR PUBLICATION

FIG. 3

BACKGROUND OF THE INVENTION

Field of the Invention

The present invention relates to an adapter system for attaching panniers or containers to luggage carriers, in particular for attaching panniers or containers to the top of a luggage carrier such as a rear bicycle luggage carrier or a similar luggage carrier with struts.

Description of the Related Art

Various variants of adapter systems or fastening devices for fastening bags to luggage carriers, in particular for fastening bags or containers to a bicycle luggage carrier, are known. Bags are very often fastened to the side of a luggage carrier and are commonly referred to as panniers or panniers for bicycles. Various variants are also known for carrying panniers and/or containers on top of a luggage carrier, which also have to meet different requirements.

DE102009030000A1 discloses a design of a pannier which has a hook element on its bottom on one side, which hook element engages around a longitudinal strut of the luggage carrier when the pannier is pushed laterally onto the luggage carrier and thus guides the pannier. On the opposite side of the bottom of the pannier there is a Velcro strap, which can be guided around another strut and is thus intended to fix the pannier.

DE 1930993 discloses a pannier which is equipped on its bottom with a central tensioning element which is loaded with a spring and presses the two parts of the element laterally outwards. By inserting one side of the tensioning element around a strut on the upper side of a luggage carrier, a kind of hook engages around a strut of the luggage carrier, and the opposite element of the tensioning element can be pushed back by pressing against the spring force so far that, after relaxing, it comes to rest behind another strut. This holds the pannier between the two struts and fastens the pannier to the top of the carrier.

DE 202004019891 U1 shows a pannier which is equipped on its bottom with Velcro straps for fastening to struts of a luggage carrier and also has lateral snap fasteners which can engage around longitudinal struts of the luggage carrier positioned thereon at a distance of the pannier width in order to fix the pannier.

Also known are systems with a retaining device to be mounted on the luggage carrier, to which in turn panniers can then be fastened. The retaining device and the pannier have appropriate corresponding coupling elements. The retaining device mounted on the luggage carrier is usually firmly connected to the luggage carrier and protrudes beyond the top of the luggage carrier.

However, this attachment to the top of the luggage carrier is bothersome, since this means that the top of the luggage carrier is no longer fully usable during operation while the pannier is not attached thereto and the retaining device constitutes an obstacle.

Some of the other known panniers and/or fastening solutions for panniers and/or containers function satisfactorily on a defined luggage carrier, but have the disadvantage that they do not support attachment or fastening to another luggage carrier, or only do so to a limited extent.

In particular, the position of the struts of the luggage carrier, their distance from one another and/or the diameter of the struts play a crucial role. For example, without a precisely defined distance between the longitudinal struts, the variants with lateral snap hooks according to DE 202004019891 or the spring-loaded tensioning element according to DE1930993 cannot be used. This is bothersome when changing the pannier from one bike to another and of course when replacing the bike with a new one, since the pannier could still be used, but, due to the requirements mentioned, it can no longer be fastened to another luggage carrier.

A further disadvantage of known panthers for attachment to the top of the luggage carrier has been found in that in particular the versions with one or more Velcro straps for fastening do not achieve sufficient stability and/or the straps considerably lose their retaining power during use or due to aging.

The panniers or containers carried on a luggage carrier in this way often slide along the upper side in their longitudinal and/or transverse position when driving, which after some time of use leads to the pannier loosening on the luggage carrier.

ASPECTS AND SUMMARY OF THE INVENTION

The object of the present invention is therefore to create an adapter system for attaching panniers or containers to luggage carriers, in particular for attaching panniers or containers to the top of a luggage carrier, which reduces or avoids the disadvantages mentioned. In particular, the object of the invention is to be able to leave the top of the luggage carrier flat if the pannier is not carried along and to enable sufficiently high stability of the fastening when the pannier is attached. The object of the invention is also the easy mounting and dismounting of the pannier or container on the luggage carrier.

This object is achieved with the features of the characterizing part of claim 1. Further developments and advantageous designs of the invention are included in the further claims.

According to the invention, an adapter system for attaching panniers or containers to luggage carriers, in particular for attaching panniers or containers to the top of a luggage carrier with releasable fixing elements for engaging around and/or on and/or in struts of a luggage carrier, wherein the position of the fixing elements is designed to be adjustable and are arranged on struts and/or cross members or plates or frames of the adapter system, wherein at least one strut and/or cross member and/or plate is designed with a plurality of retaining elements protruding from its surface facing the luggage carrier.

In a simple embodiment, the retaining elements can be formed as a knob plate, which is arranged on the bottom of the adapter system and which presses or rests, with the protruding retaining elements designed as knobs, against the longitudinal and/or transverse struts, when placed on the luggage carrier. By designing the at least protruding retaining elements in an at least partially elastic material, the adapter system is additionally secured against slipping on the upper side of the luggage carrier when the adapter system is fixed by means of the releasable fixing elements for engaging around and/or on and/or in struts of a luggage carrier. In this way, the protruding retaining elements designed as knobs are pressed against the struts on the top of the luggage carrier, whereby the position of the adapter system is additionally secured by means of friction and/or abutting of the retaining elements on the struts.

In a preferred embodiment of the invention, the bottom of the adapter system is designed as an at least partially hollowed-out plate or cross member which is provided with a plurality of openings on the bottom facing the luggage carrier. Individual retaining elements or retaining elements arranged on a mat and secured in the plate or cross member protrude through these openings. These protruding retaining elements are preferably provided with a counterforce, which, by using a spring force and/or a reversible, elastic pressure material, ensure the retaining elements push out of the openings in the plate or cross member. When attaching the adapter system with a pannier, for example, the retaining elements are slightly pushed in by the attaching force and/or the dead weight of the adapter system and of the pannier at the points where they come into contact with the struts of the luggage carrier and the further protruding retaining elements abut against the sides of the struts. This also prevents the adapter system from slipping after it has been fixed to the luggage carrier struts using the fixing elements of the adapter system.

The above and other aspects, features and advantages of the present invention will become apparent from the following description read in conjunction with the accompanying drawings, in which like reference numerals designate the same elements.

BRIEF DESCRIPTION OF THE DRAWINGS

In the following, the invention is described in more detail by way of example with reference to drawings, wherein.

DETAILED DESCRIPTION OF THE PREFERRED EMBODIMENTS

Figure 1:
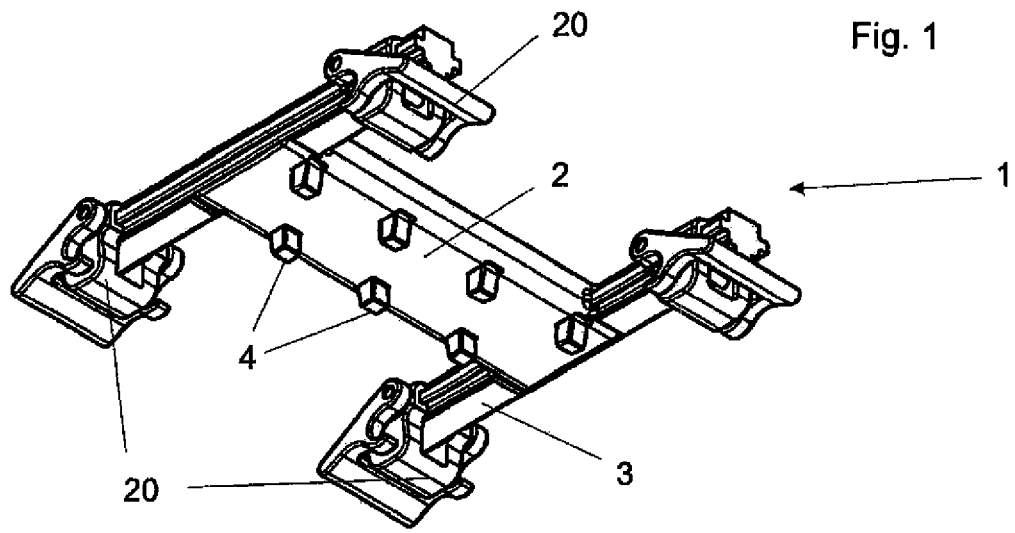
FIG. 1 shows a perspective view of an adapter system for attaching panniers or containers to luggage carriers
Figure 2:
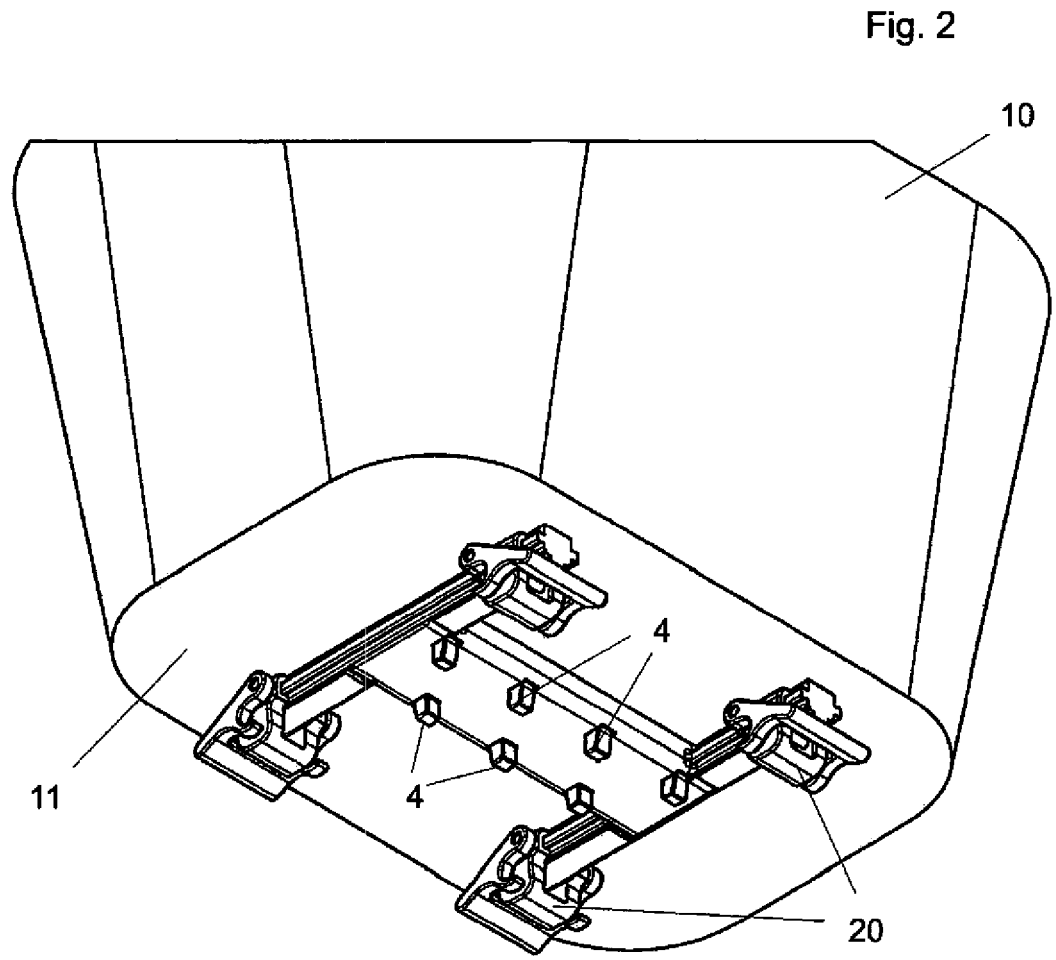
FIG. 2 shows a perspective view of an adapter system arranged on a bicycle basket

FIGS. 1 to 5 show an adapter system 1 for attaching panniers 10 or containers to luggage carriers 21, in particular for attaching panniers or containers to the top of a luggage carrier with releasable fixing elements 20 for engaging around and/or on and/or in struts 22, 23 of a luggage carrier. The pannier or the container is preferably permanently connected to the adapter system, but in some designs can also be designed so that it can be separated from the pannier by means of screw connections.

In the exemplary design shown, the adapter system has two struts 3 with a connecting central cross member 2, with releasable fixing elements 20 being arranged on the struts 3 in the area of each end, by means of which the adapter system shown in this design can be attached to or around the longitudinal struts 22 of a luggage carrier 21. The fixing elements are preferably designed to be displaceable at least along the struts 3, as a result of which the adapter system can be easily adapted to different luggage carrier geometries. The same applies to the position of the two struts 3, which can be designed to be displaceable in the central cross member in order to be able to adapt to luggage carriers of different widths. As can be clearly seen in FIG. 1, the adapter system between the two struts 3 is formed with a base plate or housing 2 which is at least partially hollowed-out and is provided with openings for protruding retaining means 4, which are formed like knobs. The retaining means 4 protruding from the housing 2 are preferably designed in the interior of the housing in such a configuration as to generate a counterforce. This can be accomplished by individual spring elements for each individual retaining means, by a common plate which is acted upon by spring force and which simultaneously acts on all retaining means or by an elastic plate or a foam plate or the like.

Figure 3:
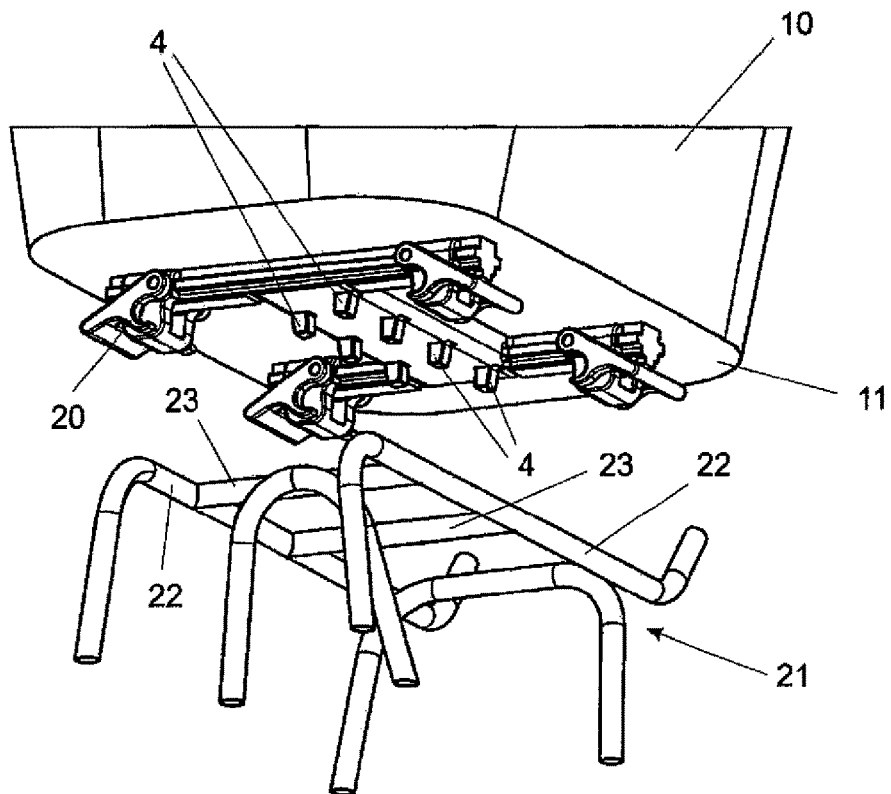
FIG. 3 shows a perspective view of an adapter system arranged on a bicycle basket above a luggage carrier.
Figure 4:
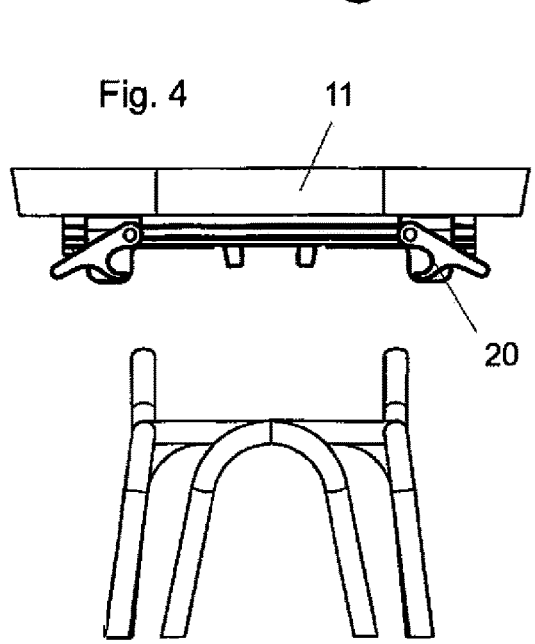
FIG. 4 shows a rear view of a luggage carrier and an adapter system.
Figure 5:
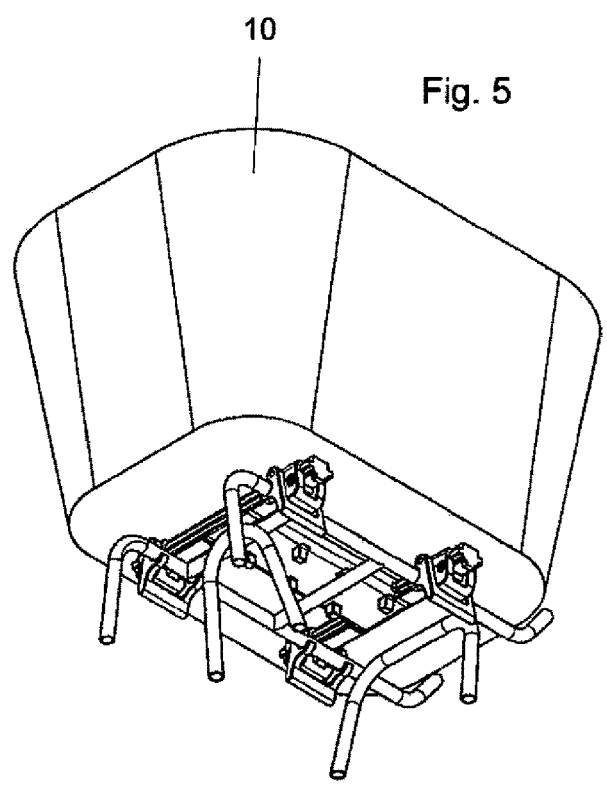
FIG. 5 shows a perspective view of an adapter system with a bicycle basket arranged thereon, attached to a luggage carrier.
Figure 6:
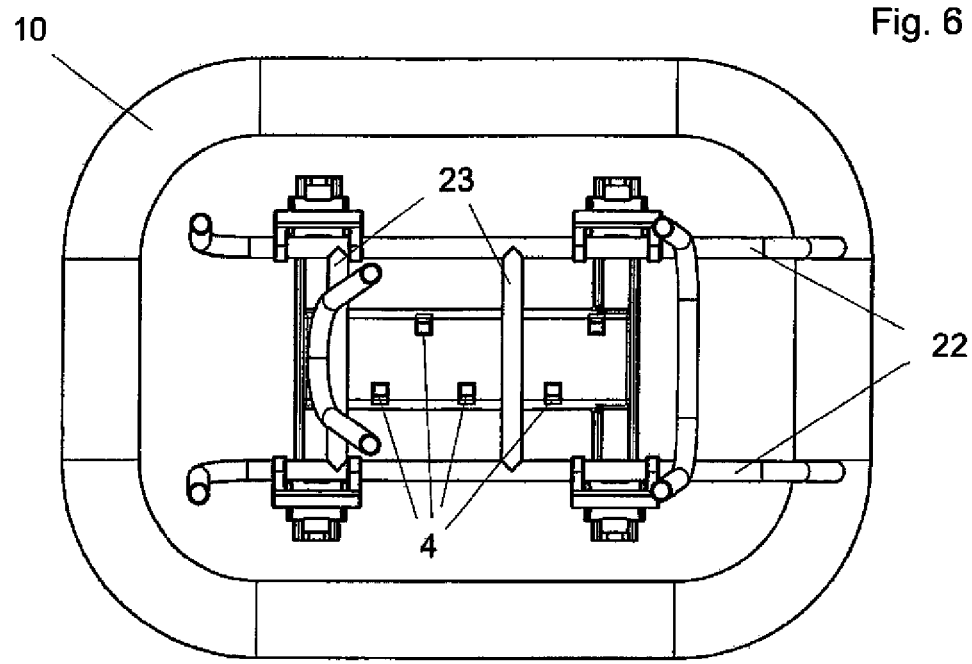
FIG. 6 shows a bottom view of the adapter system with a pannier, attached to a luggage carrier.
Figure 7:
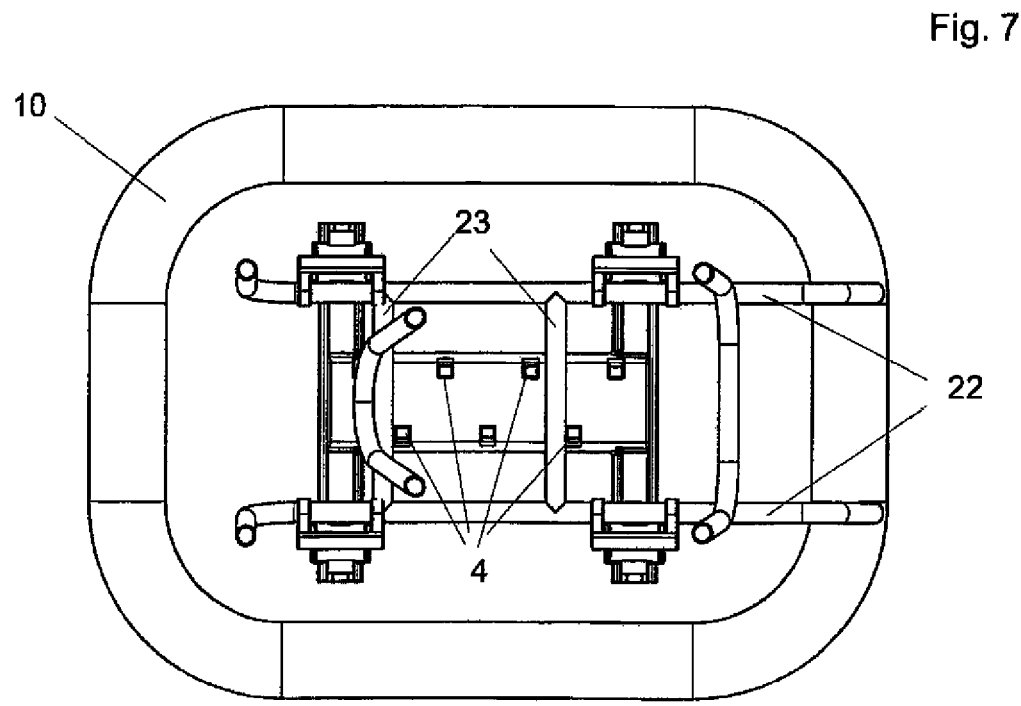
FIG. 7 shows another bottom view of the adapter system with a pannier attached to a luggage carrier.

By placing the adapter system on a luggage carrier, as shown in FIG. 3 and FIG. 5, some of the retaining means 4 are pressed, for example, onto the struts 22, 23 of the luggage carrier 21, wherein other retaining means extend again in front of or behind a cross member 23 of the luggage carrier, in this case. The adapter system is attached and fixed to the luggage carrier by means of the fixing elements 20, wherein a slippage is further prevented by the contact of the retaining means 4 with the struts of the luggage carrier. In addition, retaining means that are not resting on the struts of the luggage carrier and thus protrude in front of a cross strut 23 of the luggage carrier also block a slipping movement of the adapter system in a specific direction. This can be clearly seen in FIG. 7, where a retaining means 4 is extended in front of a cross member 23 of the luggage carrier 21 and thus effectively prevents the adapter system from slipping along the top of the luggage carrier.

Having described preferred designs of the invention with reference to the accompanying drawings, it should be noted that the invention is not limited to the precise design thereof and various changes and modifications can be made therein by one skilled in the art without departing from the scope of the invention as defined in the appended claims.

The invention claimed is:

1. An adapter system, for attaching a pannier to a luggage carrier, comprising:
    an adaptor central cross member fixed to a surface side of said pannier;
    a plurality of adaptor struts extending from said adaptor central cross member;
    at least one adaptor releasable fixing element adjustably slidably arranged on one of said plurality of adaptor struts;

a plurality of adaptor retaining elements projecting from at least one of said adaptor central cross member and said plurality of adaptor struts and toward said luggage carrier;

said luggage carrier having a plurality of luggage struts spaced by at least one luggage cross-strut;

said at least one adaptor fixing element (having a fixing receiving profile for releasably engaging with a luggage carrier fixing profile on least one of said plurality of luggage struts or said at least one luggage cross-strut;

said fixing receiving profile of said at least one adaptor fixing element being spring biased into a releasable engagement with said at least one luggage carrier fixing profile; and said luggage carrier having a respective plurality of luggage retaining element recesses shaped to receive respective ones of said plurality of adaptor retaining elements.

2. The adaptor system, according to claim 1, wherein:
said plurality of adaptor retaining elements are at least partially elastic.

3. The adaptor system, according to claim 2, wherein:
said plurality of adaptor retaining elements further comprise a friction-increasing material.

4. The adaptor system, according to claim 3, further comprising:
at least one reversibly compressible element in said luggage retaining element recess of said luggage carrier operative to act upon at least one respective adaptor retaining element.

5. The adaptor system, according to claim 4, wherein:
at least one of said plurality of retaining elements projecting from said cross member or at least one of said reversible compressive element in said luggage carrier being one of an elastomeric material, a foam material, or a rubber material.

6. The adaptor system, according to claim 5, wherein:
said at least one adaptor fixing element is fixable to said one of said plurality of adaptor struts after a sliding adjustment.

* * * * *